(12) United States Patent
Eklund et al.

(10) Patent No.: US 8,155,820 B2
(45) Date of Patent: Apr. 10, 2012

(54) METHOD, APPARATUS AND COMPUTER PROGRAM PRODUCT FOR PREDICTING AND AVOIDING A FAULT

(76) Inventors: Neil H. Eklund, Schenectady, NY (US); Xiao Hu, Schenectady, NY (US)

( * ) Notice: Subject to any disclaimer, the term of this patent is extended or adjusted under 35 U.S.C. 154(b) by 975 days.

(21) Appl. No.: 12/045,388

(22) Filed: Mar. 10, 2008

(65) Prior Publication Data
US 2009/0228160 A1    Sep. 10, 2009

(51) Int. Cl.
*G01M 17/00*    (2006.01)
(52) U.S. Cl. ............... 701/29.2; 701/3; 701/31.9
(58) Field of Classification Search ............ 701/3–18, 701/29–35
See application file for complete search history.

(56) References Cited

U.S. PATENT DOCUMENTS

| | | | | |
|---|---|---|---|---|
| 5,537,644 | A * | 7/1996 | Hamilton et al. | 706/52 |
| 6,128,555 | A * | 10/2000 | Hanson et al. | 701/13 |
| 6,560,552 | B2 * | 5/2003 | Shen et al. | 702/56 |
| 6,868,325 | B2 * | 3/2005 | Menon et al. | 701/100 |
| 7,245,995 | B2 * | 7/2007 | Kueperkoch et al. | 701/29 |
| 2002/0183866 | A1 * | 12/2002 | Dean et al. | 700/26 |
| 2003/0040878 | A1 * | 2/2003 | Rasmussen et al. | 702/85 |
| 2003/0236661 | A1 * | 12/2003 | Burges et al. | 704/205 |
| 2004/0162650 | A1 * | 8/2004 | Kueperkoch et al. | 701/29 |
| 2004/0176879 | A1 * | 9/2004 | Menon et al. | 701/1 |
| 2004/0176901 | A1 * | 9/2004 | Uluyol et al. | 701/100 |
| 2005/0021212 | A1 * | 1/2005 | Gayme et al. | 701/99 |
| 2005/0165519 | A1 * | 7/2005 | Ariyur et al. | 701/29 |
| 2005/0283909 | A1 * | 12/2005 | Mylaraswamy et al. | 5/420 |
| 2005/0288901 | A1 * | 12/2005 | Mylaraswamy et al. | 702/185 |
| 2006/0235599 | A1 * | 10/2006 | Mukherjee et al. | 701/100 |

OTHER PUBLICATIONS

Kai Goebel, Neil Eklund and Brent Brunell. Rapid Detection of Faults for Safety Critical Aircraft Operation. IEEEAC paper #1360, Version 6, Updated Dec. 17, 2003. http://best.berkeley.edu/~goebel/publications_files/IEEE_04v12.pdf.*
Leo Breiman, Bagging Predictors, *Technical Report 421*, Sep. 1994, pp. 1-19, Department of Statistics, University of California, Berkeley, California 94720.
Leo Breiman, Random Forests, *Machine Learning 45*, 2001, pp. 5-32, Kluwer Academic Publisher, Manufactured in The Netherlands.
Isabelle Guyon, Andre Elisseeff, An Introduction To Variable And Feature Selection, *Journal of Machine Learning Research 3*, 2003, pp. 1157-1182.
Xiao Hu, Kai Goebel, A Data Fusion Approach for Aircraft Engine Fault Diagnostics, *Proceedings of ASME Turbo Expo 2007*, May 14-17, 2007, pp. 1-9, ASEM Turbo Expo Congress & Exhibition, Montreal, Canada.

(Continued)

*Primary Examiner* — Mark Hellner
*Assistant Examiner* — Ari M Diacou
(74) *Attorney, Agent, or Firm* — Alston & Bird LLP

(57) ABSTRACT

A method, apparatus and computer program product are provided to not only predict an impending fault, but also to avoid the occurrence of the fault such that continued operations are permitted with a reduced likelihood of the occurrence of the fault. In this regard, a plurality of features are provided to at least one model, such as a random forest classification model. The plurality of features include features representative of at least one prior operational sequence as well as features representative of at least one upcoming operational sequence. The plurality of features are then processed with at least one model to determine a likelihood of a fault during the upcoming operational sequence. The method also alters the characteristics of the upcoming operational sequence without requiring maintenance of the equipment to thereby permit the upcoming operational sequence to be conducted with a reduced likelihood of the fault.

20 Claims, 2 Drawing Sheets

OTHER PUBLICATIONS

Figure 1:
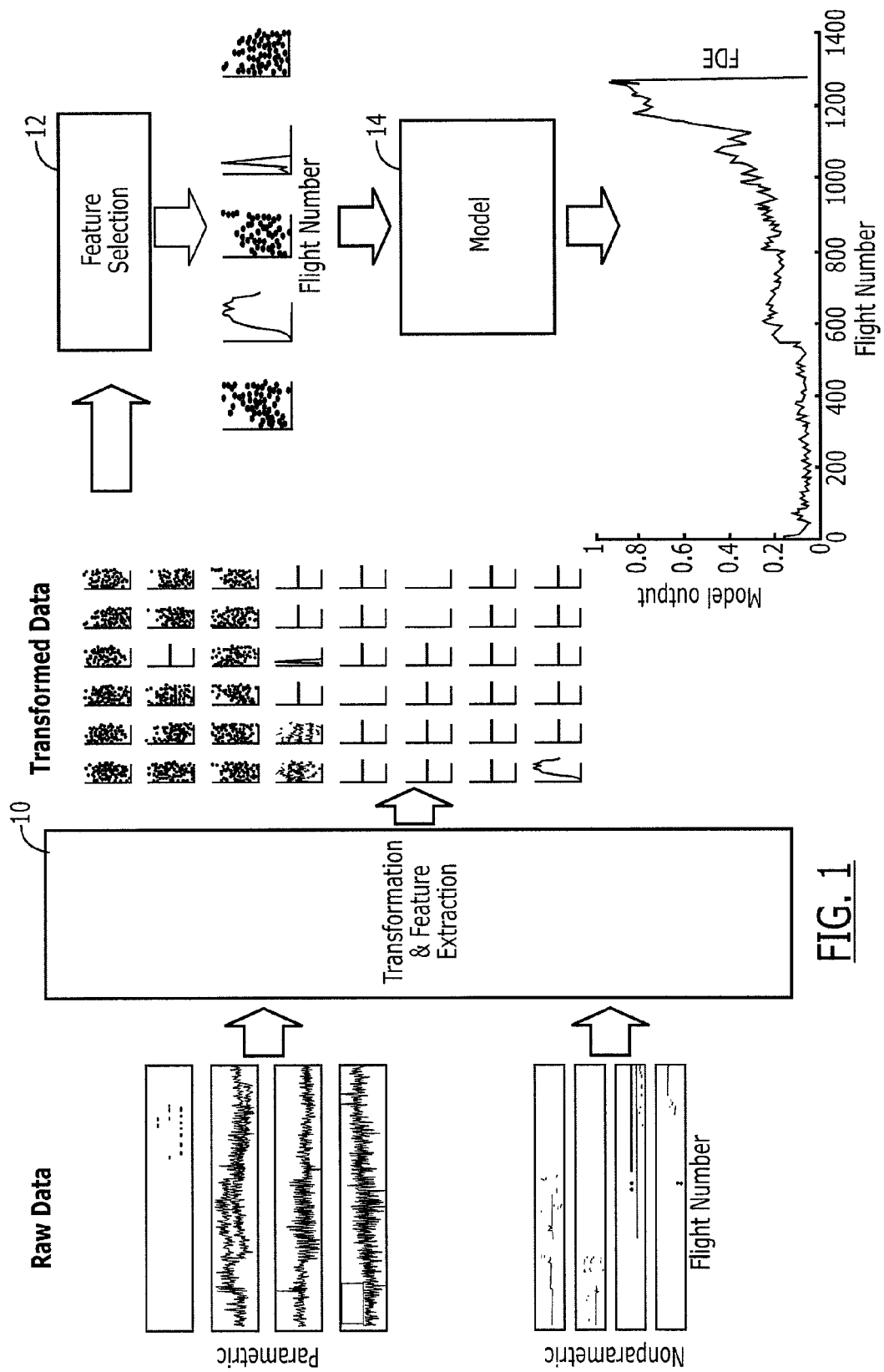

Neil H.W. Eklund, Xiao Hu, Real-Time Fault Prediction And Avoidance For Aircraft Engines, *Proceedings of 2007 IEEE Three Rivers Workshop on Soft Computing in Industrial Applications (SMCia/07)*, Aug. 1-3, 2007, 6 pages, Passau, Germany.

* cited by examiner

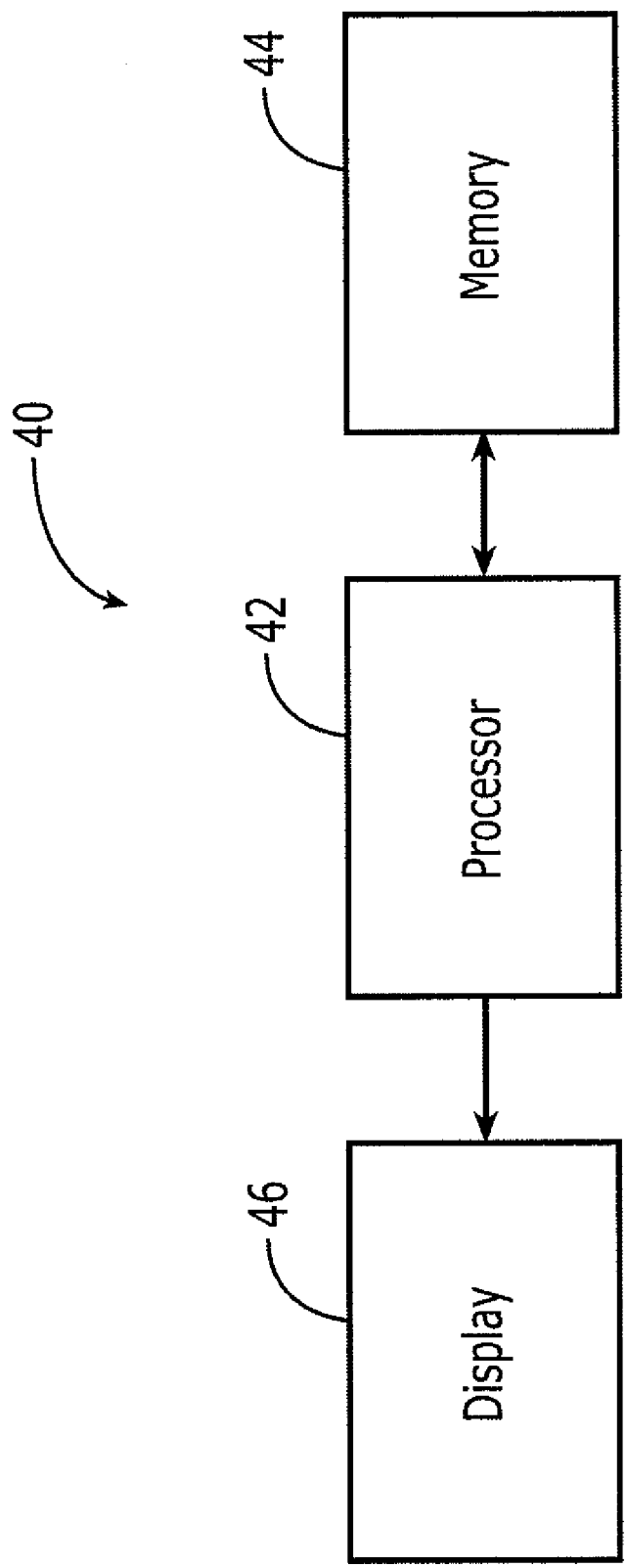

METHOD, APPARATUS AND COMPUTER PROGRAM PRODUCT FOR PREDICTING AND AVOIDING A FAULT

FIELD OF THE INVENTION

Embodiments of the present invention relate generally to the prediction of a fault and, more particularly to the avoidance of a predicted fault by facilitating the alteration of a characteristic of an upcoming operational sequence.

BACKGROUND OF THE INVENTION

The occurrence of a fault in a system or other piece of equipment may render it unavailable for service and, instead, require it to undergo maintenance in order to correct the underlying issue which caused the fault to be generated prior to being returned to service. With respect to an aircraft, a flight deck effect (FDE) generally occurs in the event of a system or subsystem failure, or the occurrence of another fault, causes a problem with the aircraft that may affect airworthiness. Some FDEs will require immediate action to remedy the underlying issue and may require that a flight either return to its origin or divert to an airport other than the original destination. Other FDEs do not affect the flight during which the FDE occurs, but will require immediate maintenance at the destination airport, which may cause a delay or cancellation of the next flight that the aircraft was scheduled to make. Other FDEs do not affect a current flight and do not require immediate action, but do create a need for unscheduled maintenance within a few days of the occurrence of the fault.

As will be apparent, the cost associated with a cancelled, diverted or turned back flight are substantial, as are the costs associated with the delay of a flight—both in terms of direct costs and the indirect costs associated with the loss of future revenues due to diminished passenger goodwill. Additionally, unscheduled maintenance is generally substantially more expensive than scheduled maintenance, both in terms of the resources required for maintenance, such as labor, shop time, expedited shipping of parts, etc., and the costs associated with an unscheduled removal of the aircraft from service. Accordingly, techniques for predicting faults, such as FDEs, can yield considerable savings by reducing unscheduled maintenance which may otherwise be necessary if an FDE unexpectedly occurs.

Accordingly, various prognostic systems have been developed to predict the occurrence of a fault, such as by estimating the remaining useful life of a system, typically expressed as a probability density function as a function of time based upon a particular future use scenario. With respect to aircraft, one prognostic approach estimates the remaining useful life of engine parts at the time of manufacture based upon fleet statistics. Such an approach has been extended to take into account the conditions of use of a particular engine system and to estimate the remaining useful life of the system. For example, an engine deployed in very hot climates will generally experience accelerated wear and a reduction in the remaining useful life relative to an engine used in more moderate climates.

Materials-based prognosis systems have also been developed to provide an estimate of the remaining useful life from the moment a system is manufactured. Materials-based systems utilize information regarding usage conditions, such as temperature, stress, etc. to estimate the remaining useful life of an individual engine part, such as a turbine blade. While materials-based prognostic systems are generally more precise than those systems premised upon fleet statistics, materials-based prognostic systems can be more costly to develop and may have a narrower range of applicability such that changes in geometry or alloy of the monitored system may significantly alter the accuracy of the predictions.

Additionally, data driven prognostic systems have been developed. Some data driven prognostic systems estimate the remaining useful life of new or deteriorated, but generally healthy, i.e., unfaulted, systems, while other data driven prognostic systems, e.g., bearings prognostic systems, estimate the remaining useful life of a system only in the presence of a fault. Ideally, data driven prognostic systems are trained on run-to-failure data from a real system; although data driven prognostic systems can be trained, with generally diminished accuracy, on data from a model of the system (e.g., a physics based model, such as a component level model of an aircraft engine). Data driven prognostic models are generally less precise than materials-based prognostic models, although both types of models are generally more precise than models based upon fleet statistics. However, data driven models are generally substantially less expensive to develop than materials-based models and may be applicable to a wider variety of systems.

With regard to data driven prognostic systems, some data driven prognostic systems utilize parametric sensor data to predict an impending fault. With respect to aircraft, parametric data may include both raw sensor measurements from the engine or airframe as well as sensor readings that have been corrected to account for flight conditions, such as altitude, ambient temperature, etc. In conjunction with an aircraft engine, for example, the parametric data may include the exhaust gas temperature, fuel flow, engine oil pressure and engine core speed. While parametric data may be useful to predict an impending fault, parametric data can be voluminous and relatively inefficient to compress such that commercial aircraft generally preserve only a few snapshots of parametric data at different intervals during a flight, such as takeoff, cruise and descent.

Other data driven prognostic systems have relied upon non-parametric data, such as the data generated in response to built-in tests that produce error log messages. For example, non-parametric error logs can be maintained which indicate when parametric measurements are beyond predefined thresholds, when certain demanded actuator positions are not reached or are not reached within a predefined time or, more generally, when a certain subsystem behaves outside of pre-defined operating parameters. The resulting non-parametric error logs are a collection of binary flags which are much easier to compress than parametric data and which may provide insight into the system status over an entire operational cycle, such as over an entire flight, as opposed to only at certain intervals.

With respect to aircraft, the parametric data and non-parametric data have typically been evaluated independent of one another. While such independent evaluation provides some useful information in regard to the prediction of faults within a system, the evaluation of each type of data may sometimes be limited. As such, a technique for predicting faults within an aircraft engine has been proposed in which both parametric data and non-parametric data are combined. In this regard, the non-parametric data may be transformed into parametric data in a variety of manners including message decaying and cumulative index techniques as described by Neil Eklund, et al., "A Data Fusion Approach for Aircraft Engine Fault Diagnostics," Proceedings of ASME Turbo Expo 2007, GT2007-27941 (May 2007). The transformed non-parametric data may then be integrated with the parametric data for analysis by traditional methods. As such, the resulting diagnostic model can have the benefit of both the parametric and nonparametric data which may be beneficial to the prediction of impending faults in a reliable manner with fewer false alarms than if either the parametric or nonparametric data were considered alone.

While the combination of the parametric data and the nonparametric data may provide improvements in regard to the prediction of an impending fault, the resulting output merely indicates the likelihood, or not, of the occurrence of a fault. If the prediction occurs sufficiently in advance of the likely occurrence of the fault, maintenance can be scheduled in an economic and efficient manner, ensuring the availability of the resources required for the repair, such as parts, mechanics and service bays. However, if the fault is imminent, e.g., a fault which will likely occur during any one of the next few operational sequences, such as the next few flights, the aircraft is generally removed from service such that the cost associated with cancelled or delayed flights may still be incurred even though the prognostic system predicted the occurrence of a fault. As such, it would be desirable to not only predict the fault, but to avoid the costs and scheduling disruptions associated with cancelled or delayed flights which may otherwise occur in response to the prediction of an imminent fault by conventional prognostic systems.

BRIEF SUMMARY OF THE INVENTION

A method, apparatus and computer program product are therefore provided in accordance with embodiments of the present invention to not only predict an impending fault, but also to avoid the occurrence of the fault such that continued operations are permitted with a reduced likelihood of the occurrence of the fault. In this regard, the method, apparatus and computer program product of embodiments of the present invention permit the continued operation of the equipment with a reduced likelihood of the occurrence of a fault without requiring maintenance of the equipment. As such, maintenance can be deferred to a more convenient and economic time, while still permitting operation of the equipment and avoiding issues, economic or otherwise, related to unscheduled unavailability of the equipment which may otherwise occur if a fault were to occur.

In accordance with one embodiment, a method of avoiding a fault during equipment operation is provided. The method provides data representative of a plurality of features to at least one model, such as a random forest classification model. The plurality of features may include features representative of an upcoming operational sequence, such as the next operational sequence. The data representative of the plurality of features are then processed with at least one model, such as a random forest classification model, to determine a likelihood of a fault during the upcoming operational sequence. The method also alters the characteristics of the upcoming operational sequence without requiring immediate maintenance of the equipment to thereby permit the upcoming operational sequence to be conducted with a reduced likelihood of the fault.

In one embodiment, at least one model is trained with data representative of the plurality of features from of at least one prior operational sequence. In this regard, the training data may, in one embodiment, include both parametric data and non-parametric data, while in other embodiments the training data may include only parametric data or only non-parametric data.

In one embodiment, the equipment is an aircraft. As such, the features representative of the upcoming operational sequence may include forecasted throttle angle and forecasted ambient temperature. If a fault is predicted on the upcoming flight based on the forecasted throttle angle and forecasted ambient temperature of the upcoming operational sequence, the weight of the aircraft may be reduced, such as by removing some of the cargo, to permit the takeoff of the aircraft with a reduced throttle setting such that the flight of the aircraft may continue as planned with a reduced likelihood of the fault and without requiring maintenance of the aircraft. As such, the flight of the aircraft can continue as scheduled and maintenance activities for the aircraft can be scheduled and then performed in a more efficient and economic manner.

In accordance with other embodiments of the present invention, an apparatus and a computer program product for providing data representative of a plurality of features to at least one model with the features including features representative of an upcoming operational sequence, for processing the data representative of the plurality of features with the at least one model to determine a likelihood of a fault during the upcoming operational sequence and for providing an output indicating that characteristics of the upcoming operational sequence should be altered to permit the upcoming operational sequence to be conducted with a reduced likelihood of the fault and without requiring maintenance of the equipment. In regard to the apparatus, the apparatus may include a processing element configured to perform these various functions. With respect to the computer program product, the computer program product may include at least one computer-readable storage medium having computer-readable program code portions stored therein with the computer-readable program code portions including executable portions for performing these various functions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a schematic illustration of the operations performed in accordance with one embodiment to the present invention; and FIG. 2 is a block diagram of an apparatus in accordance with one embodiment to the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, the operations for predicting and avoiding a fault in accordance with one embodiment of the present invention are depicted. While the method, apparatus and computer program product of the present invention may be utilized to predict faults in various types of systems such as medical devices, power generation turbines, etc., the method, apparatus and computer program product will be described in conjunction with the prediction of a fault in an aircraft engine by way of example, but not limitation.

As shown in FIG. 1, data is initially provided and will be utilized to determine if a fault is likely to occur. While various types of data may be provided including either parametric data or non-parametric data, both parametric data and non-parametric data may be provided and used in combination with one another in order to potentially improve the accuracy and reliability of the resulting prediction. With respect to an aircraft engine, the parametric data may include direct measurements from sensors on the engine and/or sensor readings that have been adjusted to compensate for the flight conditions, such as altitude, ambient temperature, etc. As noted above, examples of the parametric data are sensed speeds, temperatures and pressures, e.g., exhaust gas temperature, fuel flow, engine oil pressure and engine core speed, as well as values derived therefrom. The parametric data is generally collected from the sensor on a relatively continuous basis over a period of time, such as over the entire operational period of the aircraft engine or within one or more predefined intervals during the operational period of the aircraft engine. In this regard, sensors associated with the engines onboard commercial aircraft generally collect parametric data during certain predefined intervals, such as during takeoff, cruise and descent, while the sensors associated with the engines onboard military aircraft and the sensors associated with ground based turbines may collect parametric data on a continuous basis, typically at a relatively high frequency.

As shown in FIG. 1, non-parametric data may also be provided. The non-parametric data may be provided by various subsystems or other equipment. In the context of an aircraft engine, for example, non-parametric data may be provided by a full authority digital engine control (FADEC) system and from other subsystems on the airframe which are typically stored by the centralized maintenance computer (CMC). A wide variety of non-parametric data may be provided including non-parametric data that represents the results of built-in tests, non-parametric data that indicates instances in which parametric measurements are beyond certain thresholds, non-parametric data that indicate when demanded actuator positions are not reached or are not reached within a predefined time or non-parametric data that indicates when the subsystem or other piece of equipment behaves outside of predefined operating parameters.

Of the data that is provided, at least some of the data is representative of and is collected during at least one and, more typically, a plurality of prior operational sequences, such as during prior flights of the aircraft. In this regard, historic data representative of and collected during the prior operational sequence(s) may include both parametric data and non-parametric data. The historic data is generally employed to train the models, which are described below. The historic data may be either real data from prior operational sequences and/or data from model simulations. In either instance, the historic data is generally reflective of instances in which faults occurred and instances in which faults did not occur. In addition to the data representative of and collected during the prior operational sequence(s), the data that is provided also includes data representative of an upcoming operational sequence, such as an upcoming flight. In this regard, data is generally provided that is representative of the operating conditions associated with the next one or more operational sequences of the equipment, such as the next one or more flights. While various types of data can be provided regarding an upcoming flight, such as the next flight, data sufficient to forecast the throttle angle at takeoff and the forecasted ambient temperature may be provided in one embodiment. As known to those skilled in the art, the forecasted throttle angle is dependent upon a plurality of parameters including the weight of the aircraft (both cargo and passenger weight) and environmental factors at takeoff, such as air pressure, wind speed, temperature, precipitation, precipitation, humidity, wind direction, etc.

In order to effectively process the data to predict a fault, the parametric and non-parametric data may be transformed and subjected to a feature extraction process 10. The type of transformation and feature extraction will be dependent, in part, upon the type and form of the data, but a wide variety of suitable transformation and feature extraction processes are known to those skilled in the art. With respect to parametric data, for example, the transformation and feature extraction processes may initially remove outliers from the data, such as by Winsorization or the like, and the remaining data may then be smoothed, such as by use of an exponentially weighted moving average time series filter. With respect to the non-parametric data, the non-parametric data may initially be transformed into parametric data to facilitate subsequent processing. The non-parametric data may be transformed into parametric data in a variety of manners including a running sum transformation, message decaying and cumulative index techniques as described by Neil Eklund, et al., "A Data Fusion Approach for Aircraft Engine Fault Diagnostics," Proceedings of ASME Turbo Expo 2007, GT2007-27941 (May 2007). In accordance with embodiments of the present invention, a subset of features is then selected from among the plurality of features. As shown at element 12 in FIG. 1, a set of features is selected and then provided as input to a respective model 14.

The features may be selected in order to reduce the dimensionality of the data set which, in turn, tends to increase the generalization ability of the model. See I. Guyon, et al., "An Introduction to Variable and Feature Selection", *Journal of Machine Learning and Research*, Vol. 3, pages 1157-1182 (2003). The features may be selected in various manners as known to those skilled in the art. In one embodiment, however, a random forest classification technique is utilized to select the features from the data set. A random forest classification method applies bagging to a variation of classification trees. See, L. Breiman, "Random Forest", *Machine Learning*, 45(1), pages 5-32 (2001); L. Breiman, "Bagging Predictors", *Machine Learning*, 24(2), pages 123-40 (1996); and L. Breiman, et al., *Classification in Regression Trees*, Wadsworth, Belmont, Calif. (1984).

Regardless of the technique employed to select the features which will be provided to the model 14, the same features that define the data that is provided to the models to train the models as known to those skilled in the art also define the data representative of an upcoming operational sequence, such as an upcoming flight and, more typically, the next flight, that is analyzed by the models in order to predict an impending fault. In regard to the features that are representative of an upcoming operational sequence that are selected and provided to the model, the selected features may include one or more of the forecasted throttle angle at takeoff and forecasted ambient temperature of an upcoming flight, such as the next flight.

The selected features are provided to one or more models 14. The model generally analyzes the plurality of features, that is, the selected features provided to the model, in order to classify the features as either normal, i.e., no impending fault, or abnormal, i.e., indicative of an impending fault. As such, the model may also be termed a classifier as a result the manner in which the model endeavors to optimally partition the feature space into regions containing different classes that is, normal and abnormal. Different types of models have been developed and may be employed by the methods, apparatus and computer program product of embodiments of the present invention including a random forest classification method. Other types of models include neural networks, such as generalized regression neural networks, logistic regression models as well as other machine learning techniques. See C. M. Bishop, *Neural Networks for Pattern Recognition*, Oxford University Press (1995) and D. W. Hosmer, et al., *Applied Logistic Regression*, John Wiley & Sons, NY (1989). Each of these models may be trained based upon historical data from both prior operational sequences that did include faults and prior operational sequences that did not include faults to predict impending faults in an upcoming operational sequence.

The output of the model 14 may be utilized for predicting an impending fault. In other words, the output of the model can determine the likelihood of a fault during an upcoming operational sequence, such as during the next flight. With regard to the graphical representation of the output of the model depicted in FIG. 1, a fault, e.g., an FDE, may be determined to be likely to occur during the upcoming operational sequence if the output associated with the upcoming operational sequence, such as the next flight, exceeds a predefined threshold. With reference to the graphical representation of FIG. 1, for example, if the predefined threshold were 0.85 and if the next flight was to be the $1300^{th}$ flight, the output of the model would indicate that the occurrence of a fault during the next flight was likely since the output of the model for the $1300^{th}$ flight exceeded the predefined threshold of 0.85.

Conventionally, an output of a model that is indicative of the likely occurrence of a fault, e.g., FDE, during the next flight would have caused the aircraft to be taken out of service for maintenance and would have resulted in a cancelled or delayed flight, either of which has a disadvantageous financial impact as noted above. In accordance with embodiments of the present invention, however, an indication that the fault is likely during the next flight may cause an alert or other notification to be issued which (depending upon the type of anticipated fault) indicates that certain characteristics of the upcoming operational sequence, such as next flight, can be altered in order to avoid the occurrence of the predicted fault. In this regard, not all types of predicted faults may be resolved by altering the characteristics of the upcoming operational sequence and then permitting continued operation without requiring repair or other maintenance activities intended to remedy the underlying issue which caused the fault. For example, some faults, such as bearing faults and fan blade cracks, are not alleviated by altering the characteristics of the upcoming operational sequence and, therefore, the repair of such faults cannot generally be deferred by reducing the weight or otherwise altering the characteristics of the upcoming operational sequence. However, the manifestation of other types of faults, such as at least some of the faults caused by engine component performance deterioration, can be postponed by altering the characteristics of the upcoming operational sequence, thereby avoiding the occurrence of the fault during the upcoming operational sequence and permitting maintenance to be scheduled in a more economic and efficient manner, thereby avoiding the adverse financial consequences associated with cancellation or delay of the upcoming operational sequence.

With respect to an aircraft; for example, a model 14 may provide an output indicative of the likely occurrence of an FDE associated with excessive exhaust gas temperature, such as during a take off. Since an exhaust gas temperature FDE will generally occur in instances in which an aircraft is heavily loaded, or is taking off at a high altitude or high temperature airport or a combination of loading, altitude and temperature so as to require a maximum or near maximum throttle level angle takeoff, the method, apparatus and computer program product of embodiments of the present invention may alert the owner and/or operator of the aircraft and advise it of the likely fault which will occur during the next flight of the aircraft. The method, apparatus, and computer program product of embodiments to the present invention may also notify or otherwise advise the owner and/or operator of the aircraft that the predicted exhaust gas temperature FDE may be avoided if the weight of the aircraft were reduced, such as by removing some of the cargo, which might permit the takeoff of the aircraft at a lower throttle setting. In this regard, a listing of faults, e.g., FDEs, which may be at least temporarily avoided and the steps which need to be taken to avoid the FDEs may be provided to facilitate the provision of recommendation to the owner and/or operator of the aircraft or the like to avoid the occurrence of the fault during the next operational sequence. The owner and/or operator of the aircraft would then have the opportunity to remove some of the cargo and reduce the likelihood of occurrence of the fault during the next flight, while still permitting the flight to occur as scheduled without necessitating the performance of maintenance activities upon the aircraft in an effort to correct the underlying problems leading to the predicted fault. By permitting the flight to continue as scheduled, the adverse financial consequences and the potential loss of good will that could otherwise be created by a cancelled or delayed flight are avoided. Additionally, the necessary maintenance for the aircraft to remedy the issues underlying the predicted fault can be scheduled at a more convenient time, thereby permitting the maintenance activities to be performed in a more economic and efficient manner, while permitting higher aircraft utilization than would have occurred if the aircraft had to have been taken out of service at the time that the exhaust gas temperature FDE was predicted.

Although generally described above in conjunction with the prediction of a fault during the next operational sequence, embodiments of the present invention may predict a fault during any one of a plurality of upcoming operational sequences. Since the prediction of faults in the above-described embodiment is dependent upon the forecasted ambient temperature, such as the forecasted ambient temperature at takeoff, as well as the forecasted throttle angle at takeoff, an impending fault can be predicted with the most accuracy in regards to the next flight since the ambient temperature and throttle angle at takeoff will be forecast with the most accuracy. In conjunction with the above-described embodiment, however, impending faults can be predicted with other flights further in the future so long as the temperature at takeoff and the throttle angle at takeoff can be forecast. In this regard, temperatures can generally be forecast with meaningful accuracy for the upcoming three days and, in some instances (such as in the event of an upcoming heat wave), for longer periods of time.

While described above in conjunction with a single model providing an output that is indicative of the likely occurrence of a fault, the method of other embodiments may employ multiple models that have been appropriately trained to receive data representative of the same or different features relating to an upcoming operational sequence and to produce respective outputs that may be fused in order to indicate the likelihood of a fault during the upcoming operational sequence. In this regard, the outputs of the models may be fused in various manners. For example, the outputs from the models may simply be added to one another. Alternatively, the outputs of the models may be fused by treating the output from each model as an intermediate feature space, and using an additional classifier to fuse the individual model output into a single output. Alternatively, the fusion may be done in the decision space derived from the individual classifier using a variety of methods. See L. Kuncheva, *Combining Pattern Classifiers: Methods and Algorithms*, Wiley-Interscience (Jul. 1, 2004) for an overview of such fusion methods. As shown in FIG. 2, the apparatus 40 of embodiments of the present invention is typically embodied by a processing element 42 and an associated memory device 44, both of which are commonly comprised by a computer or the like. In this regard, the method of embodiments of the present invention as set forth generally in FIG. 1 can be performed by the processing element executing a computer program instructions stored by the memory device. The memory device may also store the data in some embodiments. The computer can include a display 46 for presenting the image and any other information relative to performing embodiments of the method of the present invention.

The apparatus 40 may operate under control of a computer program product according to another aspect of the present invention. The computer program product for performing the methods of embodiments of the present invention includes a computer-readable storage medium, such as the non-volatile storage medium, e.g., memory device 44, and computer-readable program code portions, such as a series of computer instructions, embodied in the computer-readable storage medium.

In this regard, FIG. 1 depicts the operations performed by the methods, systems and program products according to exemplary embodiments of the present invention. It will be understood that each operation can be implemented by computer program instructions. These computer program instructions may be loaded onto a computer or other programmable apparatus, e.g., processing element 42, to produce a machine, such that the instructions which execute on the computer or other programmable apparatus create means for implementing the operations illustrated in FIG. 1. These computer program instructions may also be stored in a computer-readable memory that can direct a computer or other programmable apparatus to function in a particular manner, such that the instructions stored in the computer-readable memory produce an article of manufacture including instruction means which implement the operations illustrated in FIG. 1. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the operations illustrated in FIG. 1. It will also be understood that the operations illustrated in FIG. 1 can be implemented by special purpose hardware-based computer systems which perform the operations, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of avoiding a fault during aircraft operation, the method comprising:

providing data representative of a plurality of features to at least one model, wherein the plurality of features are representative of an upcoming operational sequence, and wherein the at least one model has been trained with data that is representative of a prior operational sequence in which a fault occurred and data that is representative of a prior operational sequence in which a fault did not occur;

processing, with a computer, the data representative of the plurality of features with the at least one model to determine a likelihood of a fault during the upcoming operational sequence;

providing a recommendation of one or more steps to be taken to reduce a likelihood of the fault during the upcoming operational sequence; and altering characteristics of the upcoming operational sequence in accordance with the recommendation without requiring maintenance of the aircraft to thereby permit the upcoming operational sequence to be conducted with the reduced likelihood of the fault, wherein altering the characteristics of the upcoming operational sequence comprises reducing the weight to permit flight of the aircraft with a reduced likelihood of the fault and without requiring maintenance of the aircraft.

2. A method according to claim 1 wherein the upcoming operational sequence comprises a next operational sequence.

3. A method according to claim 1 wherein the upcoming operational sequence comprises any one of a plurality of subsequent operational sequences.

4. A method according to claim 1 wherein the features representative of the upcoming operational sequence comprises at least one of weight, forecasted throttle angle or forecasted ambient temperature.

5. A method according to claim 1 further comprising training the at least one model with parametric data, nonparametric data or both parametric data and nonparametric data from at least one prior operational sequence.

6. A method according to claim 1 wherein processing the data representative of the plurality of features comprises processing the plurality of features with a random forest classification model.

7. A method according to claim 1 wherein processing the data representative of the plurality of features comprises processing the data representative of the plurality of features with a plurality of models that have been trained to receive data representative of different features and then fusing outputs of the plurality of models to determine a likelihood of a fault during the upcoming operational sequence.

8. An apparatus for avoiding a fault during aircraft operation, the apparatus comprising:

a processing element configured to provide data representative of a plurality of features to at least one model, wherein the plurality of features comprise features representative of an upcoming operational sequence, and wherein the at least one model has been trained with data that is representative of a prior operational sequence in which a fault occurred and data that is representative of a prior operational sequence in which a fault did not occur, said processing element also configured to process the data representative of the plurality of features with the at least one model to determine a likelihood of a fault during the upcoming operational sequence, said processing element further configured to provide an output including a recommendation indicating that characteristics of the upcoming operational sequence should be altered to permit the upcoming operational sequence to be conducted with a reduced likelihood of the fault and without requiring maintenance of the aircraft, wherein said processing element is configured to provide an output indicating that the weight of the aircraft should be reduced to permit flight of the aircraft with a reduced likelihood of the fault and without requiring maintenance of the aircraft.

9. An apparatus according to claim 8 wherein the upcoming operational sequence comprises a next operational sequence.

10. An apparatus according to claim 8 wherein the upcoming operational sequence comprises any one of a plurality of subsequent operational sequences.

11. An apparatus according to claim 8 wherein the features representative of the upcoming operational sequence comprises at least one of weight, forecasted throttle angle or forecasted ambient temperature.

12. An apparatus according to claim 8 wherein said processing element is further configured to train the at least one model with parametric data, nonparametric data or both parametric data and nonparametric data from at least one prior operational sequence.

13. A apparatus according to claim 8 wherein said processing element is configured to process the data representative of the plurality of features with a random forest classification model.

14. An apparatus according to claim 8 wherein said processing element is configured to process the data representative of the plurality of features with a plurality of models that have been trained to receive data representative of different features and to then fuse outputs of the plurality of models to determine a likelihood of a fault during the upcoming operational sequence.

15. A computer program product comprising at least one computer-readable storage medium having computer-readable program code portions stored therein, the computer-readable program code portions comprising:

a first executable portion for providing data representative of a plurality of features to at least one model, wherein the plurality of features comprise features representative of an upcoming operational sequence, and wherein the at least one model has been trained with data that is representative of a prior operational sequence in which a fault occurred and data that is representative of a prior operational sequence in which a fault did not occur;

a second executable portion for processing the data representative of the plurality of features with the at least one model to determine a likelihood of a fault during the upcoming operational sequence; and a third executable portion for providing an output including a recommendation indicating that characteristics of the upcoming operational sequence should be altered to permit the upcoming operational sequence to be conducted with a reduced likelihood of the fault and without requiring maintenance of the equipment aircraft, wherein the third executable portion is further configured to provide an output indicating that the weight of the aircraft should be reduced to permit flight of the aircraft with a reduced likelihood of the fault and without requiring maintenance of the aircraft.

16. A computer program product according to claim 15 wherein the upcoming operational sequence comprises a next operational sequence.

17. A computer program product according to claim 15 wherein the upcoming operational sequence comprises any one of a plurality of subsequent operational sequences.

18. A computer program product according to claim 15 wherein the features representative of the upcoming operational sequence comprises at least one of weight, forecasted throttle angle or forecasted ambient temperature.

19. A computer program product according to claim 15 further comprising a fourth executable portion for training the at least one model with parametric data, nonparametric data or both parametric data and nonparametric data from at least one prior operational sequence.

20. A computer program product according to claim 15 wherein the second executable portion is further configured to process the data representative of the plurality of features with a plurality of models that have been trained to receive data representative of different features and to then fuse outputs of the plurality of models to determine a likelihood of a fault during the upcoming operational sequence.

* * * * *